United States Patent
Hsieh et al.

(10) Patent No.: US 7,671,524 B2
(45) Date of Patent: Mar. 2, 2010

(54) FLAT LIGHT SOURCE HAVING PHOSPHOR PATTERNS IN AN EDGE REGION

(75) Inventors: Yu-Heng Hsieh, Taipei (TW); Chu-Chi Ting, Hualien County (TW); Hsiang-Hui Tseng, Taoyuan County (TW); Su-Chiu Lee, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 486 days.

(21) Appl. No.: 11/309,000

(22) Filed: Jun. 7, 2006

(65) Prior Publication Data
US 2007/0284996 A1    Dec. 13, 2007

(51) Int. Cl.
*H01J 1/62* (2006.01)
*H01J 63/04* (2006.01)

(52) U.S. Cl. .................. 313/493; 313/495; 313/498; 445/24

(58) Field of Classification Search ......... 313/491–498, 313/581–587
See application file for complete search history.

(56) References Cited

U.S. PATENT DOCUMENTS

| | | | |
|---|---|---|---|
| 6,583,555 B2 | 6/2003 | Matsukawa et al. | 313/495 |
| 6,611,099 B1 * | 8/2003 | Murata et al. | 313/582 |
| 6,762,556 B2 * | 7/2004 | Winsor | 313/607 |
| 2002/0079827 A1 * | 6/2002 | Park | 313/485 |
| 2005/0206298 A1 * | 9/2005 | Lee et al. | 313/495 |

FOREIGN PATENT DOCUMENTS

| | | |
|---|---|---|
| JP | 2002-075223 | 3/2002 |
| JP | 2002-075289 | 3/2002 |

\* cited by examiner

*Primary Examiner*—Sikha Roy
*Assistant Examiner*—Tracie Green
(74) *Attorney, Agent, or Firm*—Jianq Chyun IP Office

(57) ABSTRACT

A flat light source having a main region and an edge region around the main region is provided. The flat light source includes a first substrate, first electrodes, dielectric patterns, a phosphor layer, first phosphor patterns, a second substrate, and a sealant. The first electrodes are disposed on the first substrate and arranged within the main region and the edge region. The dielectric patterns cover the first electrodes. The phosphor layer is disposed between the dielectric patterns in the main region and the edge region. The first phosphor patterns are disposed on the phosphor layer within the edge region. The second substrate is disposed above the first substrate, and the sealant is formed out of the edge region between the first and second substrates so as to bond the two substrates.

17 Claims, 4 Drawing Sheets

FLAT LIGHT SOURCE HAVING PHOSPHOR PATTERNS IN AN EDGE REGION

BACKGROUND OF THE INVENTION

1. Field of Invention

The present invention relates to a flat light source. More particularly, the present invention relates to a flat light source with high brightness and high illumination uniformity.

2. Description of Related Art

In recent years, liquid crystal display panels (LCD panels) have become the main stream for most display screens. However, since the LCD panel itself cannot emit lights, a back light module has to be provided under the LCD panel to be a light source, so as to display. The light source in the back light module is typically provided by one or more lamps, and the light emitted by the lamp passes through optical films in the back light module and is scattered, such that a surface light source suitable for irradiating the LCD panel is created.

However, if a flat light source can be directly employed, the utilization efficiency of the light can be improved and a more uniform surface light source can be provided, and besides, the flat light source can also be applied in many other fields than as the back light source of LCD panel. Therefore, the flat light source is advantageous in its development.

Generally, the flat light source is a plasma light-emitting element, which emits light through producing high energy electrons by a high voltage difference between the electrode pairs, and then the high energy electrons may bombard the inert gas so as to form the so-called plasma. After that, the excited atoms in the plasma release energy by way of emitting UV, which will then be used to further excite the phosphor in the flat light source, so as to emit visible light.

However, the current flat light source has distinctly lower brightness or presents a non-white color at its peripherals. This is because the light-emitting efficiency of phosphor in the edge of the flat light source is lower than that in the central area. Therefore, the brightness around the flat light source tends to be dimmer.

SUMMARY OF THE INVENTION

Therefore, the objective of the invention is to provide a flat light source, which can solve the disadvantages of the conventional flat light source with dimmer brightness at its peripherals.

The invention proposed a flat light source having a main region and an edge region around the main region. The flat light source includes a first substrate, first electrodes, dielectric patterns, a phosphor layer, first phosphor patterns, a second substrate and a sealant. The first electrodes are disposed on the first substrate and arranged within the main region and the edge region. The dielectric patterns cover the first electrodes. The phosphor layer is disposed between the dielectric patterns in the main region and the edge region. The first phosphor patterns are disposed on the phosphor layer within the edge region. The second substrate is disposed above the first substrate, and the sealant is formed out of the edge region between the first and second substrate so as to bond the two substrates.

In an embodiment of the invention, the length of the first phosphor patterns described above is between 0.1 and 5 mm.

In an embodiment of the invention, the width of the first phosphor patterns described above is between 0.1 and 5 mm.

In an embodiment of the invention, the height of the first phosphor patterns described above is between 0.03 and 0.4 mm.

In an embodiment of the invention, the distance between two adjacent first phosphor patterns in the edge region is between 0.1 and 5 mm.

In an embodiment of the invention, the material of the first phosphor patterns described above is the same with that of the phosphor layer.

In an embodiment of the invention, the flat light source further includes second phosphor patterns disposed on the phosphor layer within the main region. Preferably, the density of the second phosphor patterns disposed in the main region is smaller than that of the first phosphor patterns in the edge region. In one embodiment, the material of the second phosphor patterns is the same with that of the phosphor layer. In another embodiment, the size of the second phosphor patterns is the same with that of first phosphor patterns. In yet another embodiment, the size of the second phosphor patterns is different from that of the first phosphor patterns.

In an embodiment of the invention, the flat light source further includes a reflective layer disposed on the first substrate.

In an embodiment of the invention, the flat light source further includes spacers disposed between the first substrate and the second substrate.

In an embodiment of the invention, the flat light source further includes another phosphor layer disposed on the surface of the second substrate.

In an embodiment of the invention, the flat light source further includes second electrodes disposed on the surface of the second substrate.

In an embodiment of the invention, the material of the first electrodes described above includes metal.

In an embodiment of the invention, the material of the first substrate and the second substrate described above include glass.

In the flat light source of the invention, since the phosphor layer in the edge region is further disposed with first phosphor patterns to enhance the luminance, the problem of dimmer brightness around the conventional flat light source can be solved.

In order to make the above and other objects, characteristics and advantages of the invention more apparent, the preferred embodiments will be illustrated in detail below with reference to the accompanying drawings.

DESCRIPTION OF EMBODIMENTS

Figure 1A:
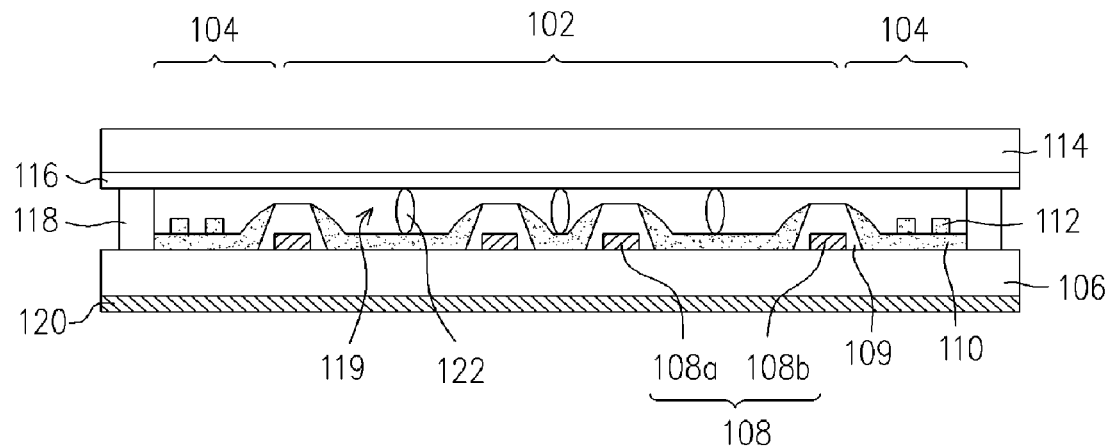
FIG. 1A is a cross-sectional schematic view of the flat light source according to a preferred embodiment of the invention.
Figure 1B:
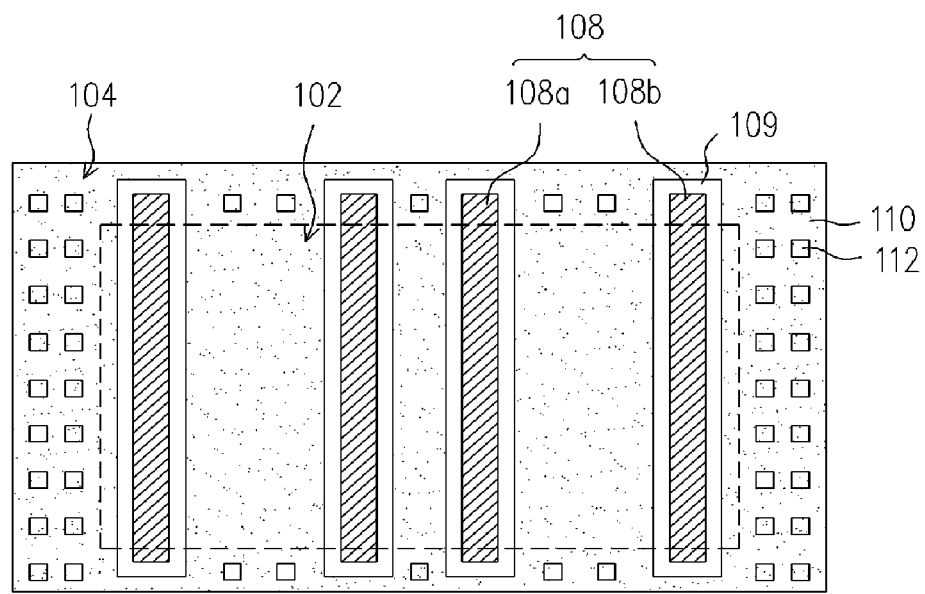
FIG. 1B is a top view of the members on the second substrate in the flat light source of FIG. 1A.

FIG. 1A is a cross-sectional schematic view of the flat light source according to a preferred embodiment of the invention. FIG. 1B is a top view of the first substrate in the flat light source of FIG. 1A. Referring to FIGS. 1A and 1B, the flat light source of the invention has a main region 102 and an edge region 104 around the main region 102. The flat light source includes a first substrate 106, first electrodes 108, a second substrate 114, a sealant 118, dielectric patterns 109, a phosphor layer 110 and first phosphor patterns 112. The material of the first substrate 106 and the second substrate 114 is, for example, transparent glass. The sealant 118 is formed out of the edge region 104 between the first substrate 106 and the second substrate 114 so as to bond the two substrates 106, 114, and a closed space 119 will thus be formed between the sealant 118 and the two substrates 106, 114. A discharging gas may be filled into the closed space 119.

As shown in FIG. 1A, the first electrodes 108 are disposed on the first substrate 106 and arranged within the main region 102 and the edge region 104. The first electrodes 108 may be divided into cathode electrodes 108a and anode electrodes 108b. After a high voltage difference is formed between the cathode electrodes 108a and the anode electrodes 108b, the so-called plasma can be formed by bombarding the inert gas with the high energy electrons. In a preferred embodiment, the material of the first electrodes 108 includes a metal.

The dielectric patterns 109 are formed on the first substrate 106 to cover the first electrodes 108 on the first substrate 106. The material of the dielectric patterns 109 is silicon dioxide or metal oxide.

The phosphor layer 110 is coated between two adjacent dielectric patterns 109 within the main region 102 and the edge region 104. If the excited atoms in the plasma emit UV to further excite the phosphor layer 110, visible light will be emitted. According to the present invention, the used phosphor layer 110 includes a phosphor material that can emit white light.

Particularly, the phosphor layer 110 in the edge region 104 is further disposed with first phosphor patterns 112. In an embodiment, the material of the first phosphor patterns 112 is the same with that of the phosphor layer 110. The first phosphor patterns 112 are formed by, for example, screening printing or coating process. Additionally, the length of the first phosphor patterns 112 is, for example, between 0.1 and 5 mm; the width of the first phosphor patterns 112 is, for example, between 0.1 and 5 mm; the height of the first phosphor patterns 112 is, for example, between 0.03 and 0.4 mm; the distance between two adjacent first phosphor patterns 112 is, for example, between 0.1 and 5 mm. The sizes and densities of the first phosphor patterns 112 may be adjusted as required. That is, the larger the amount and densities of the first phosphor patterns 112, the higher the brightness of the edge region 104. In addition, the first phosphor patterns 112 shown in drawings are illustrated with a rectangular cube, which is only illustrative but not intended to limit the present invention, which may also be cylinder or taper, provided that the protrusion patterns (protrusions) can be formed on the phosphor layer 110 in the edge region 104.

The first phosphor patterns 112 disposed on the phosphor layer 110 in the edge region 104 can dramatically increase the surface area of the phosphor layer of the edge region 104. Therefore, the invention can solve the problem of the conventional flat light source with dimmer brightness in the edge region 104. Once the brightness in the edge region of the flat light source is increased, the overall illumination uniformity of the flat light source will be improved.

In order to enhance the brightness of the flat light source, the flat light source described above may optionally be installed with other members, as described hereinafter. Referring to FIG. 1A, in a preferred embodiment, the flat light source may also include a reflective layer 120 disposed on the surface of the first substrate 106. When the light produced by the flat light source is directed to the reflective layer 120, it will be reflected in a direction toward the second substrate 114, so that the light produced by the flat light source are all reflected out by the second substrate 114. Furthermore, the flat light source of the invention may also include another phosphor layer 116, which is disposed on the surface of the second substrate 114, as shown in FIG. 1A. The installation of the phosphor layer 116 can further enhance the brightness of the flat light source.

According to another embodiment of the invention, the flat light source of the invention further includes spacers 122, which are disposed between the first substrate 106 and the second substrate 114 so that a fixed gap may be maintained between the two substrates 106, 114. For small flat light sources, spacers may not necessarily be used, but for large flat light sources, spacers 122 are typically used. The spacers 122 may be spacer balls uniformly dispersed between the two substrates 106, 114. The spacers 122 may also be spacer columns formed on the first substrate 106 or the second substrate 114.

Figure 2A:
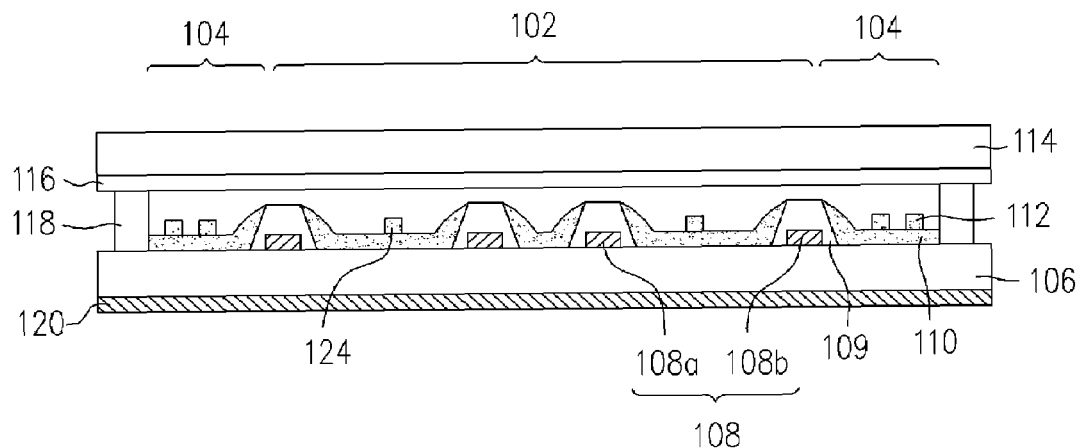
FIG. 2A is a cross-sectional schematic view of the flat light source according to another preferred embodiment of the invention.
Figure 2B:
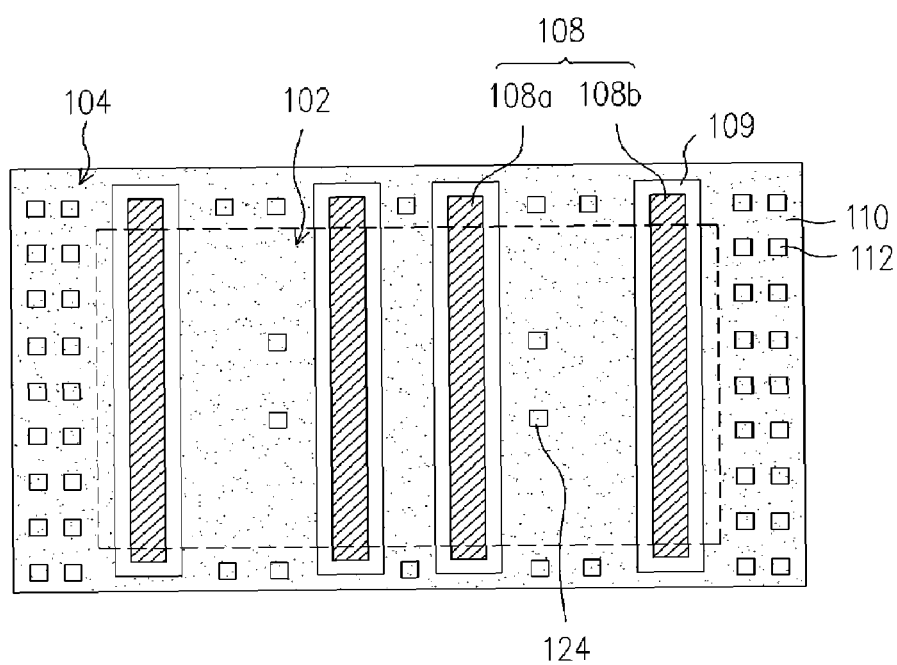
FIG. 2B is a top view of the members on the second substrate in the flat light source of FIG. 2A.

FIG. 2A is a cross-sectional schematic view of the flat light source according to another preferred embodiment of the invention. FIG. 2B is a top view of the members on the second substrate in the flat light source of FIG. 2A. Referring to FIGS. 2A and 2B, the flat light source of FIG. 2A is similar to that of FIG. 1A, with the difference in that the flat light source of FIG. 2A further includes second phosphor patterns 124 disposed on the phosphor layer 110 of the main region 102. The surface area of the phosphor layer 110 may be increased where second phosphor patterns 124 are additionally disposed, thereby to enhance the brightness of the flat light source. In other words, besides first phosphor patterns 122 disposed in the edge region 104, the flat light source of FIG. 2A further has second phosphor patterns 124 disposed in the main region 102. In order to produce a good illumination uniformity in the main region 102 and the edge region 104, the density of the first phosphor patterns 112 disposed in the edge region 104 may be higher than that of the second phosphor pattern 124 in the main region 102. In this way, not only the brightness of the flat light source could be increased, but also the overall illumination uniformity of the flat light source could be improved. In an embodiment, the material of the second phosphor patterns 124 in the main region 102 can be the same with that of the phosphor layer 110. And the size of the second phosphor patterns 124 may be the same with or different from that of the phosphor pattern 112.

Figure 3A:
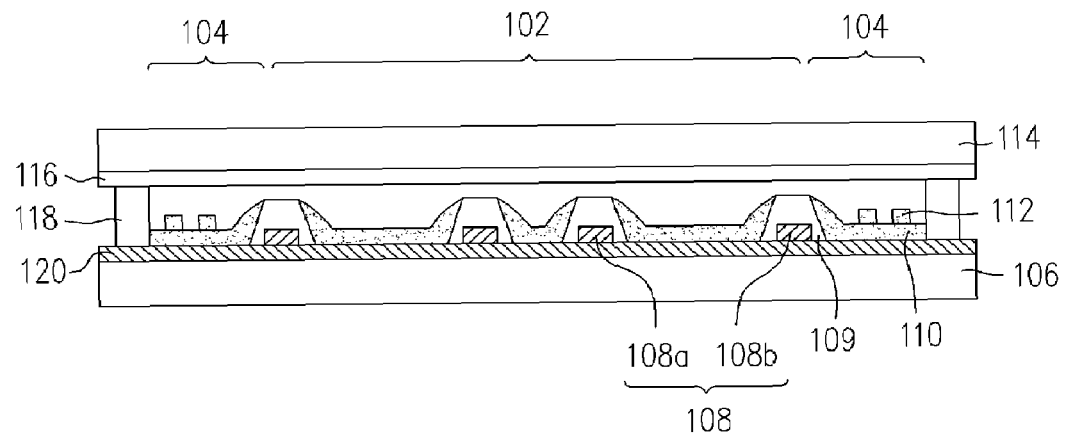
FIGS. 3A and 3B are cross-sectional schematic views of the flat light source according to preferred embodiments of the invention.

FIG. 3A is a cross-sectional schematic view of the flat light source according to another preferred embodiment of the invention. The flat light source shown in FIG. 3A is similar to the flat light source shown FIG. 1A, with the differences in that the reflective layer 120 of the flat light source in FIG. 3A is disposed between the first substrate 106 and the first electrodes 108. That is, after a reflective layer 120 is formed on the first substrate 106, first electrodes 108 are formed on the reflective layer 120. Similarly, whether it is necessary to dispose spacers (not shown) between the two substrates 106, 114 shall be determined for the flat light source in FIG. 3A according to the actual needs (for example, the size).

Figure 3B:
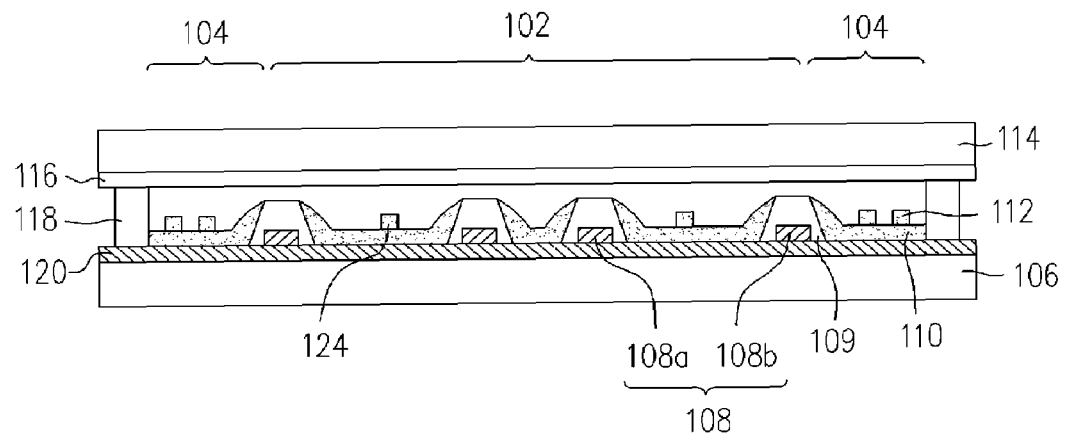

FIG. 3B is a cross-sectional schematic view of the flat light source according to another preferred embodiment of the invention. The flat light source shown in FIG. 3B is similar to the flat light source shown FIG. 3A, with the differences in that the flat light source of FIG. 3B further includes second phosphor patterns 124 disposed on the phosphor layer 110 of the main region 102. In other words, besides the reflective layer 120 disposed between the first substrate 106 and the first electrodes 108, the first flat light source of FIG. 3B further has first phosphor patterns 122 disposed on the phosphor layer 110 in the edge region 104, and second phosphor patterns 124 on the phosphor layer 110 in the main region 102.

It should be noted that in the embodiments described above, the first electrodes 108 on the first substrate 106 are illustrated as a set of two electrodes 108a, 108b, however, in practice, the first electrodes 108 may also be a set of three or more electrodes (not shown).

Figure 4A:
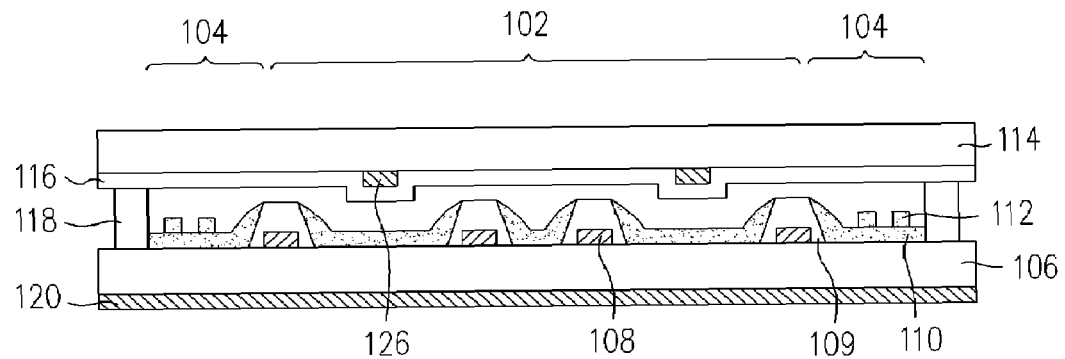
FIGS. 4A and 4B are cross-sectional schematic views of the flat light source according to preferred embodiments of the invention.

FIG. 4A is a cross-sectional schematic view of the flat light source according to another preferred embodiment of the invention. The flat light source shown in FIG. 4A is similar to the flat light source shown FIG. 1A, with the differences in that the flat light source of FIG. 4A further includes second electrodes 126 disposed between the second substrate 114 and the phosphor layer 116. In this embodiment, the first electrodes 108 on the first substrate 106 are used as cathode electrodes (or cathode), while the second electrodes 126 on the second substrate 114 are used as anode electrodes (or anode). In other words, after a high voltage difference is formed between the two electrodes 108, 126, the so-called plasma can be formed by bombarding the discharging gas with the high energy electrons.

Figure 4B:
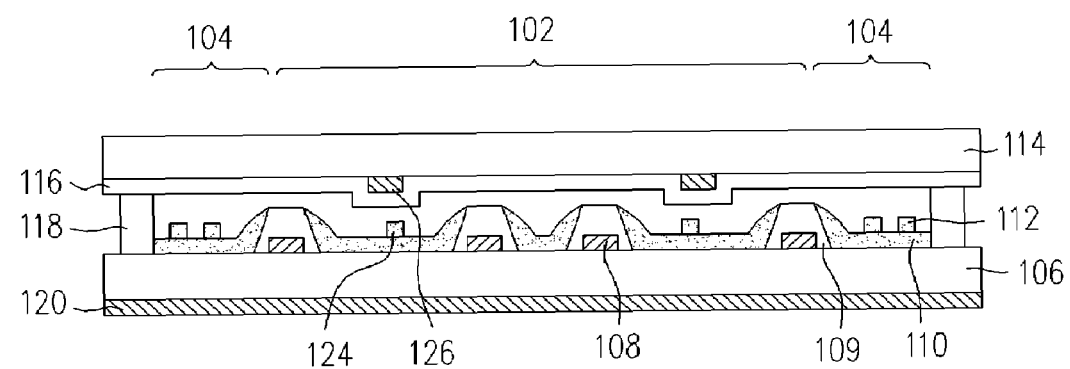

FIG. 4B is a cross-sectional schematic view of the flat light source according to another preferred embodiment of the invention. The flat light source shown in FIG. 4B is similar to the flat light source shown FIG. 4A, with the difference in that the flat light source of FIG. 4B further includes second phosphor patterns 124 disposed on the phosphor layer 110 of the main region 102. In other words, besides the second electrodes 126 disposed on the second substrate 114, the first flat light source of FIG. 4B further has first phosphor patterns 122 disposed on the phosphor layer 110 in the edge region 104, and second phosphor patterns 124 on the phosphor layer 110 in the main region 102.

In the embodiments described above, the electrodes are described as simple strip electrodes, which are not intended to limit the present invention. In practice, the shape of each electrode may be varied, for example strip electrodes with protruded tip, non-linear strip electrodes, etc.

In summary, the flat light source of the invention has the following advantages:

Since protruded phosphor patterns are additionally disposed in the edge region of the flat light source in the invention so that the surface area of the phosphor layer in the edge region is increased and the luminance therein is enhanced, the flat light source of the invention solves the problem of conventional flat light source with lower brightness at the edge.

As the invention can enhance the brightness in the edge region of the flat light source, the overall illumination uniformity of the flat light source is also improved.

Besides the phosphor patterns disposed in the edge region, the invention may further have phosphor patterns disposed in the main region, thereby the brightness of the flat light source can be further enhanced. And both the brightness and illumination uniformity of the flat light source can be improved by adjusting the densities of the phosphor patterns disposed in the edge region and the main region.

Although the invention has been disclosed above with reference to preferred embodiments, which are only illustrative but not intended to limit the present invention, and various changes and modifications can be made by those skilled in the art without departing from the spirit and scope of the invention as defined by the attached claims.

What is claimed is:

1. A flat light source having a main region and an edge region around the main region, comprising:
   a first substrate;
   a plurality of first electrodes, disposed on the first substrate and arranged within the main region and the edge region;
   a plurality of dielectric patterns, covering the first electrodes;
   a phosphor layer, disposed between the dielectric patterns in the main region and the edge region;
   a plurality of first phosphor patterns, disposed on the phosphor layer, wherein the first phosphor patterns are only disposed within the edge region;
   a second substrate, disposed above the first substrate; and
   a sealant, disposed out of the edge region between the first and second substrates so as to bond the first and second substrates, wherein the plurality of first phosphor patterns are separated from the sealant.

2. The flat light source as claimed in claim 1, wherein the length of the first phosphor patterns is between 0.1 and 5 mm.

3. The flat light source as claimed in claim 1, wherein the width of the first phosphor patterns is between 0.1 and 5 mm.

4. The flat light source as claimed in claim 1, wherein the height of the first phosphor patterns is between 0.03 and 0.4 mm.

5. The flat light source as claimed in claim 1, wherein the distance between two adjacent first phosphor patterns in the edge region is between 0.1 and 5 mm.

6. The flat light source as claimed in claim 1, wherein the material of the first phosphor patterns is the same with that of the phosphor layer.

7. The flat light source as claimed in claim 1, further comprising a plurality of second phosphor patterns disposed on the phosphor layer within the main region.

8. The flat light source as claimed in claim 7, wherein the density of the second phosphor patterns disposed in the main region is smaller than that of the first phosphor patterns in the edge region.

9. The flat light source as claimed in claim 7, wherein the material of the second phosphor patterns is the same with that of the phosphor layer.

10. The flat light source as claimed in claim 7, wherein the size of the second phosphor patterns is the same with that of the first phosphor patterns.

11. The flat light source as claimed in claim 7, wherein the size of the second phosphor patterns is different from that of the first phosphor patterns.

12. The flat light source as claimed in claim 1, further comprising a reflective layer disposed on the surface of the first substrate.

13. The flat light source as claimed in claim 1, further comprising a plurality of spacers disposed between the first substrate and the second substrate.

14. The flat light source as claimed in claim 1, further comprising another phosphor layer disposed on the surface of the second substrate.

15. The flat light source as claimed in claim 1, further comprising a plurality of second electrodes disposed on the surface of the second substrate.

16. The flat light source as claimed in claim 1, wherein the material of the first electrodes includes metal.

17. The flat light source as claimed in claim 1, wherein the material of the first substrate and the second substrate include glass.

* * * * *